United States Patent [19]

MacMillan

[11] 4,130,384
[45] Dec. 19, 1978

[54] TIRE CURING PRESS

[76] Inventor: Kenneth T. MacMillan, 4992 Wesleyan Woods Dr., Macon, Ga. 31202

[21] Appl. No.: 849,864

[22] Filed: Nov. 9, 1977

[51] Int. Cl.² .................... B29H 5/04; B29H 5/08
[52] U.S. Cl. .................................. 425/25; 425/451.2
[58] Field of Search ................ 425/17, 21, 23, 25, 425/24, 450.1, 451.2, 444, 556, 595, 590, DIG. 221, DIG. 223

[56] References Cited

U.S. PATENT DOCUMENTS

| 2,302,133 | 11/1942 | Mage | 425/21 |
|---|---|---|---|
| 2,895,166 | 7/1959 | MacMillan | 425/25 |
| 3,074,109 | 1/1963 | Dverksen | 425/23 |
| 3,156,014 | 1/1964 | Wenger | 425/DIG. 223 |
| 3,263,277 | 8/1966 | Ohlendorf et al. | 425/451.2 |
| 3,270,372 | 9/1966 | Hesse | 425/451.2 |
| 3,613,171 | 10/1971 | Hehl | 425/DIG. 223 |
| 3,669,593 | 6/1972 | Cyriox | 425/451.2 X |
| 3,669,599 | 6/1972 | Snider et al. | 425/595 |
| 3,687,590 | 8/1972 | Cyriox | 425/444 X |
| 3,737,278 | 6/1973 | Putzler | 425/590 X |
| 3,768,953 | 10/1973 | Dangremond et al. | 425/DIG. 221 |
| 4,005,974 | 2/1977 | Szabo | 425/DIG. 223 |
| 4,022,554 | 5/1977 | MacMillan | 425/25 X |

FOREIGN PATENT DOCUMENTS 1127069  4/1962  Fed. Rep. of Germany ........ 425/451.2
1938905 11/1971  Fed. Rep. of Germany ............. 425/25

Primary Examiner—I. Howard Flint, Jr.
Attorney, Agent, or Firm—Diller, Ramik & Wight

[57] ABSTRACT

A press having press members movable between open and closed positions and wherein when the press is in its closed condition there is an internal force urging separation of the press members. Locking means are provided for retaining the press members in their closed positions, the locking means being in the form of short stroke, large force fluid motors which serve to prevent accidental separation of the press members during the operation of the press.

14 Claims, 7 Drawing Figures

TIRE CURING PRESS

This invention relates in general to new and useful improvements in press assemblies, such as tire curing presses, and more particularly relates to the locking of such presses in closed positions.

Presses are customarily opened and closed by means of extensible fluid motors which need to be of limited force applying capacity for the purpose of opening and closing the presses. However, when space is required between the press members for loading and unloading the press, it is necessary that the fluid motors for opening and closing the press have a very long stroke. On the other hand, when the same fluid motors are utilized for the purpose of retaining the press in its closed condition against high internal pressures, such fluid motors must have large force applying capabilities. The net result in the usual press construction is provided with fluid motors of restricted capacity and when an exceptional condition exists, such fluid motors are frequently overloaded with the result that the press undesirably opens and undesirable accidents may occur. It is also to be understood that high force applying fluid motors normally have high pressures with the result that expensive high pressure fittings and hoses, as well as other high pressure equipment, is required.

In accordance with this invention, it is proposed to provide a press assembly wherein the movable press member or members is positioned by low pressure fluid motors or cylinders which merely serve to open and close the press and wherein there are separate locking means for locking the press in its closed state, thereby relieving the fluid motors or cylinders of the press member positioning apparatus without a load thereon which could possibly cause rupture of the motors or fluid connections therefor.

In accordance with this invention it is proposed to provide locking means in the form of high force applying fluid motors which have only a very short stroke with the fluid motors being operable after the press is closed solely for the purpose of holding the press in its closed state.

Beneficially, the movable press member is provided with an opening therethrough so that when the movable press member is moved to an open position, the locking fluid motor may pass through such opening. When the press member is moved to its closed position, a force applying pad is moved into bridging relation with respect to the opening so that the locking fluid motor may then apply the necessary force on the press member to retain the press in its closed condition without in any way relying upon the press opening and closing fluid motors.

In accordance with this invention, the locking means are adjustable so as to permit the press member to have variable closed positions. For example, when the press is a tire curing press, the press members may be spaced from one another differently in the closed position thereof depending upon the thickness of the tire molding matrices carried thereby. Adjustment to compensate for the varying positions of the press member may be in the form of an adjustable connection between a head and a piston of the locking fluid motor. Alternatively, a plurality of pad elements may be provided with only those pad elements receivable between the locking fluid motor and the press member in the adjusted position of the press being positionable between the locking fluid motor and the press member. In a further modification, the head of the locking fluid motor may be provided with interchangeable and removable pads or shims.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
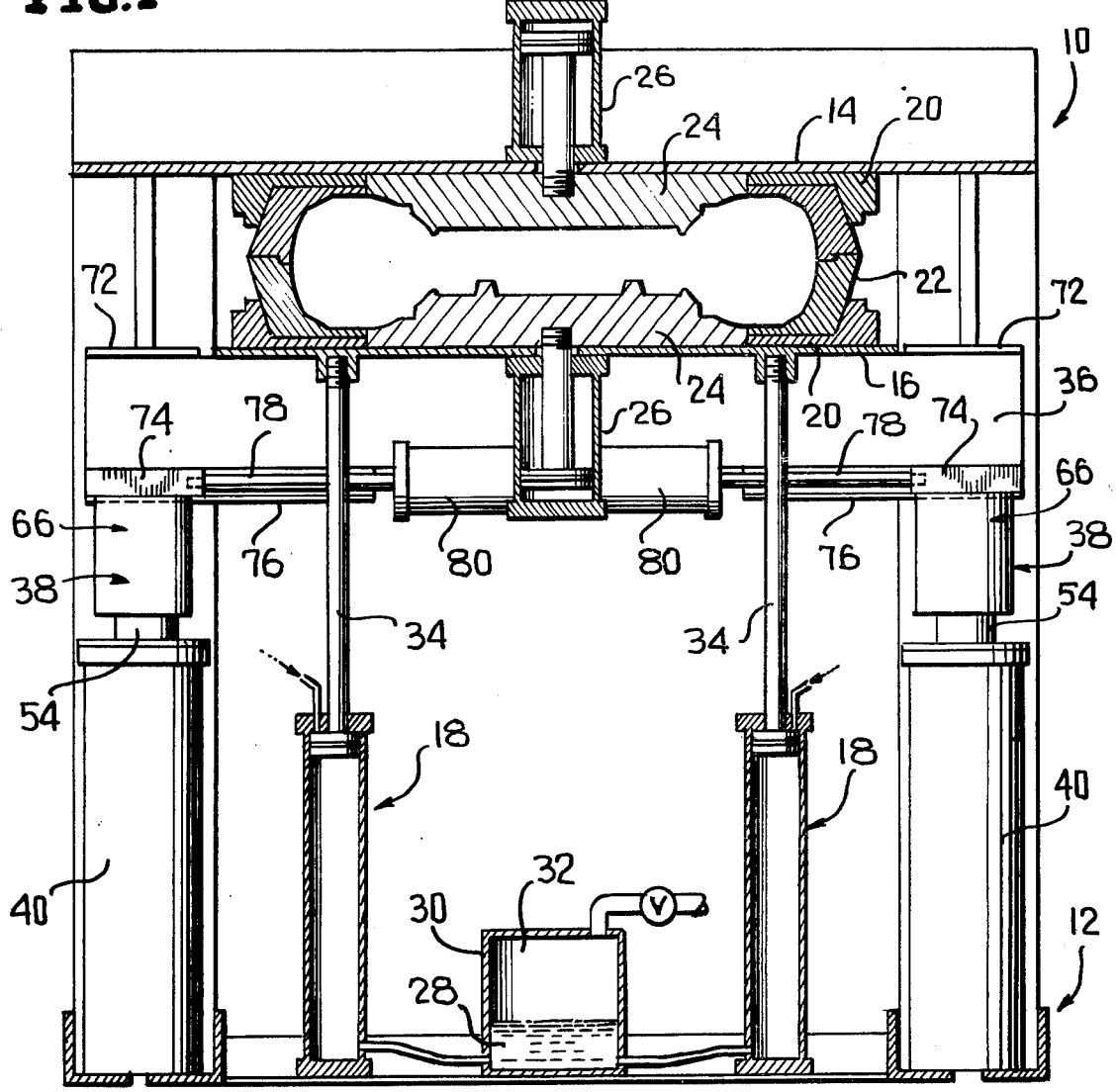
FIG. 1 is a vertical sectional view through a tire curing press incorporating the locking means of this invention.

Referring now to the drawings in detail, it will be seen that there is illustrated in FIG. 1 a press assembly formed in accordance with this invention, the press assembly being generally identified by the numeral 10. The press assembly 10 includes a frame, generally identified by the numeral 12, and the frame 12 carries a fixed upper press member 14. The press assembly 10 also includes a lower movable press member 16 which is suitably guided by the frame 12 in any conventional manner and is cooperable with the press member 14.

As is customary, the movable press member 16 is moved from the illustrated closed position of FIG. 1 downwardly to an open position by means of fluid motors. In the illustrated embodiment, there are two fluid motors 18 although there may be an additional number, such as three or four. The number of fluid motors does not form a part of this invention.

The illustrated press is one particularly adapted for curing tires, and therefore is provided with a pair of shell halves 20 which carry a sectional matrix 22 which is configurated for forming a tread on a tire. It is to be understood that a tire is mounted within a mold defined by the shells 20 and the segmented matrix 22 and is then loaded into the press 10 on the press member 16. The press member 16 is then elevated until the mold is clamped between the two press members 14 and 16.

Each of the press members or platens 14, 16 carries a bead aligner 24 which, in turn, is carried by a fluid motor 26 of the extensible type. The function of the press 10 as a tire curing press is conventional and need not be specifically described herein.

Although the extensible fluid motors 18 may be of any type, in the illustrated embodiment of the invention they are actuated by hydraulic fluid 28 in a pressure reservoir 30 under the influence of air 32. Each fluid motor 18 includes a piston 34 which has its upper end suitably secured to the lower press member 16 or a supporting frame 36 thereof.

As described above, the force applying capacity of the fluid motors 18, in accordance with this invention, need only be sufficient to effect a closing or general closing of the mold. In accordance with this invention, there are provided fluid locking means for assuring that the mold is closed and is retained in its closed state during the performing of any desired operation within the press even though such operation may place an internal pressure within the press operating to urge separation of the press members 14, 16.

The fluid locking means in a customary version of the press 10 would include a pair of fluid locking motors 38 which are fixedly carried by the lower part of the frame 12 and which are cooperable with the lower press member or platen 16 or the framework 36 thereof to apply a very high pressure closing force thereon. It is to be understood that each of the fluid locking motors 38 is to be of the short stroke, high force type.

Figure 3:
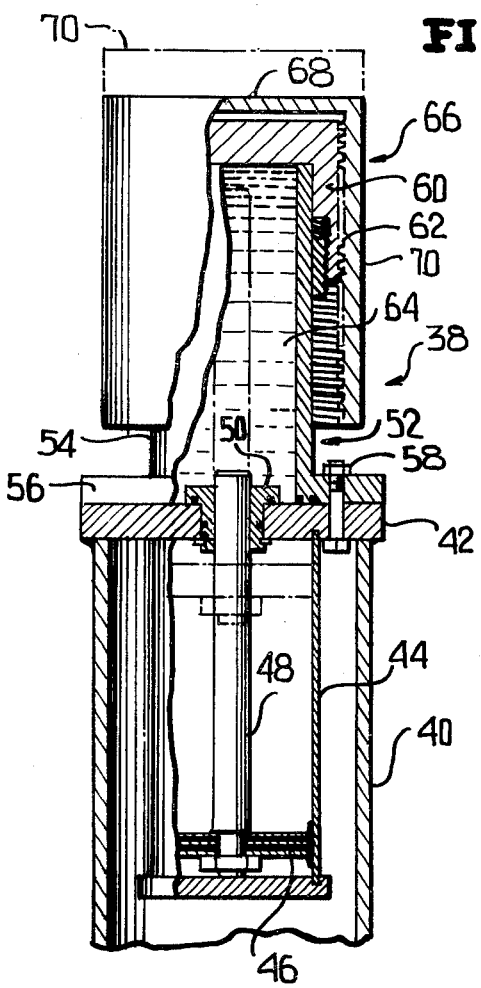
FIG. 3 is an enlarged fragmentary sectional view taken through the upper portion of one of the locking fluid motors.

In the embodiment of FIG. 1, each fluid locking motor 38 includes a heavy duty base 40 having a cover plate 42, as is best shown in FIG. 3. Carried by the cover plate 42 is a large diameter air cylinder 44 which has mounted therein a piston 46 carrying a piston rod 48. The piston rod extends through a sealing bushing 50 carried by the cover plate 42.

Overlying the cover plate 42 and operable by the piston rod 48 is a fluid motor, generally identified by the numeral 52. The fluid motor 52 includes a cylinder 54 having a mounting flange 56 secured to the cover plate 42 by means of suitable fasteners 58. The fluid motor also includes a cup-shaped piston 60 which is telescoped over the upper end of the cylinder 54 and is sealed relative thereto by a suitable seal 62.

It will be seen that the upper end of the piston 48 projects into the cylinder 54 and as its moves into the cylinder 54, it decreases the effective volume of the cylinder 54 causing the hydraulic fluid 64 within the cylinder 54 to exert a pressure on the piston 60 and urge the same upwardly relative to the cylinder 54. It thus may be seen that the effective part of the fluid locking motor 38 is one of very small movement but wherein a high force may be exerted therewith.

In order that the fluid locking motor 38 may have a minimal stroke, there is provided a force applying head 66 which is adjustable relative to the piston 60. The force applying head 66 is also of an inverted cup-shape configuration and includes an end wall 68 and a depending skirt 70. The skirt 70 is internally threaded and is engaged with external threads on the piston 60. Thus by rotating the head 66 relative to the piston 60, it will be seen that the end wall 68 may be vertically adjusted.

Returning once again to FIG. 1, it will be seen that the lower press member or platen 16 and its rigidifying frame 36 are cut out to have openings 72 therein aligned with the heads 66. The openings are of sufficient size to permit the lower press member 16 to move downwardly relative to the fluid locking motors 38 and their supporting bases 40.

In order that forces may be applied on the lower press member 16 by the fluid locking motors 38, pads 74 are mounted in guideways 76 on the underside of the reinforcing frame 36 for movement into bridging relation with respect to the openings 72 and overlying the heads 66. The pads 74 are carried by piston rods 78 of extensible fluid motors 80. It will be seen that when the lower press member 16 is elevated to a press closing or generally closing position, the pads 74 may be moved outwardly to their bridging positions. The pads 74, when the heads 66 are properly adjusted, closely overly the heads 66 so that only very little movement of the heads 66 is required before they engage the pads 74 and begin completely to lock up the press 10.

It will be readily apparent that the construction of the fluid locking motors 38 is such that only relatively low air pressure is required to obtain the very high force required to lock the press 10 in its closed condition, and therefore the locking arrangement assures a complete locking of the press against accident opening even when low air pressures are utilized.

Figure 2:
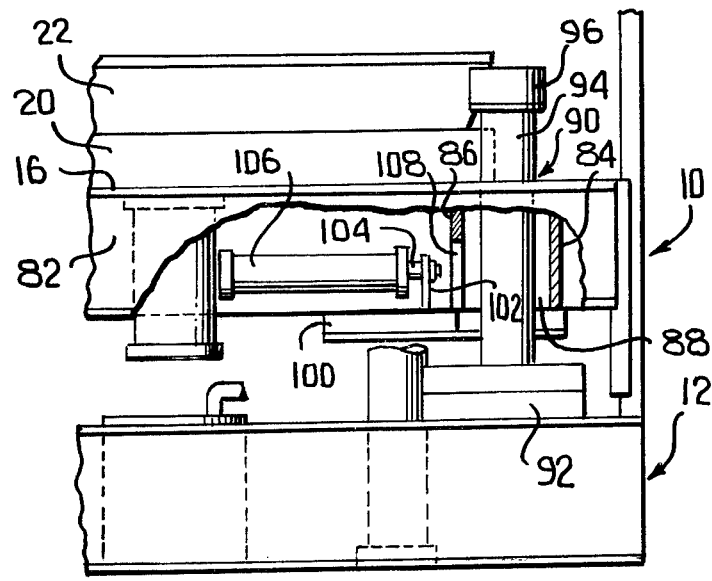
FIG. 2 is a fragmentary side elevational view showing the press assembly of FIG. 1 in its opened position and with parts broken away and shown in section, and with a modified pad and locking fluid motor.
Figure 4:
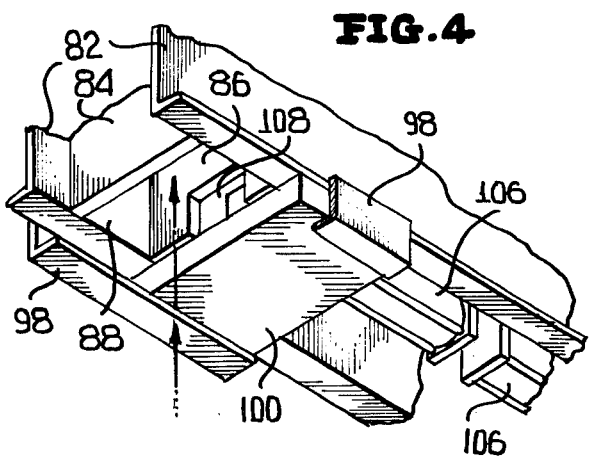
FIG. 4 is a fragmentary bottom perspective view showing the mounting of a force transmitting pad on the underside of the movable press member.

Reference is now made to FIG. 2, wherein the press 10 is illustrated with the lower press member 16 in its opened position and wherein there is a slightly modified form of fluid locking motor and pad arrangement. The lower press member or plate 16, as is best shown in FIG. 4, is reinforced by a pair of transversely extending beams 82 which are interconnected by a pair of plates 84, 86 adjacent opposite ends thereof with each pair of plates 84, 86 defining a through opening 88. The frame 12 of the press 10 carries in alignment with each of the through openings 88 a fluid locking motor, generally identified by the numeral 90. Each fluid locking motor 90 includes an enlarged base 92 and an upwardly extending cylinder 94 having mounted thereon for relative movement a head 96 which is carried by a piston (not shown) in the same manner as in the case of the fluid locking motor 38 in FIG. 3. The fluid locking motor 90 differs from the fluid locking motor 38 primarily in that the base is relatively short and the upper portion is relatively long and of a smaller diameter so as to require a smaller size opening through the press member 16.

Carried by the beams 82 are a pair of guide channels 98 which, in turn, carry a heavy pad member 100 for bridging the opening 88. The pad member 100 has an upstanding flange 102 to which there is secured a piston rod 104 of an extensible fluid motor 106 which is mounted between the beams 82. In order that the flange 102 may pass through the plate 86, the plate 86 has an opening 108 therethrough.

Except for the above described differences, it is to be understood that the press of FIG. 2 will be of the same construction as the press of FIG. 1 and will operate in the same manner.

Figure 5:
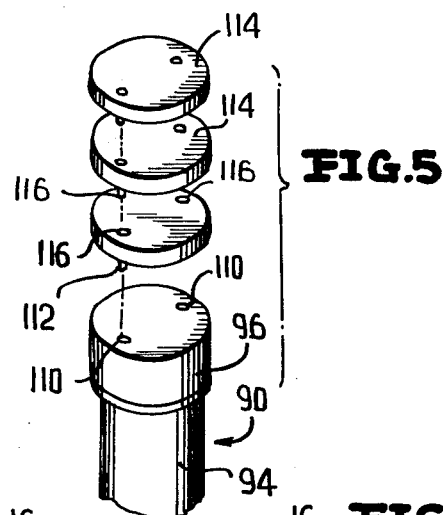
FIG. 5 is a fragmentary top perspective view showing a locking fluid motor having shims for use in accordance with the varying closed positions of the movable press member.

Referring now to FIG. 5, it will be seen that the head 96 of each fluid locking motor 90 may be particularly adapted for receiving a plurality of shims so as to compensate for varying closed positions of the press member or platen 16. To this end, the head 96 is provided with a pair of openings 110 which receive pins 112 of an underlying pad 114 each pad, in turn, has openings 116 in the upper surface thereof for receiving pins 112 of the next upper pad. With particular reference to a tire curing press, it is to be understood that the mold assembly mounted within the press will be of different thicknesses or heights depending upon the size of the tire being cured. Accordingly, the press 10 will be constructed so that when there is mounted between the press members 14, 16 the largest or thickest mold and the press is in its closed position, the head 96 will just clear the pad 100.

The shims 114 will be provided so as to place the uppermost shim in close proximity to the pad 100 when the thinnest or smallest mold is mounted within the press.

Figure 6:
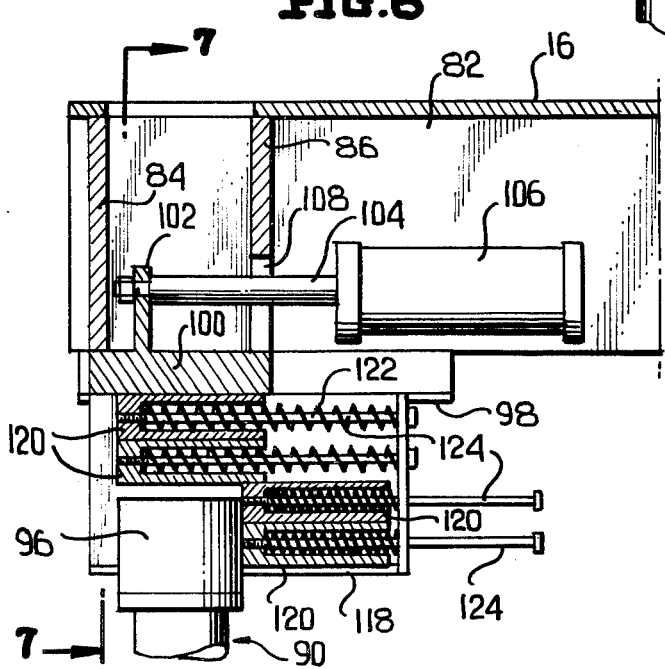
FIG. 6 is a fragmentary sectional view through a modified form of pad arrangement wherein a plurality of pads are mounted for positioning between the locking fluid motor and the movable press member in accordance with the varying closed positions of the press member.
Figure 7:
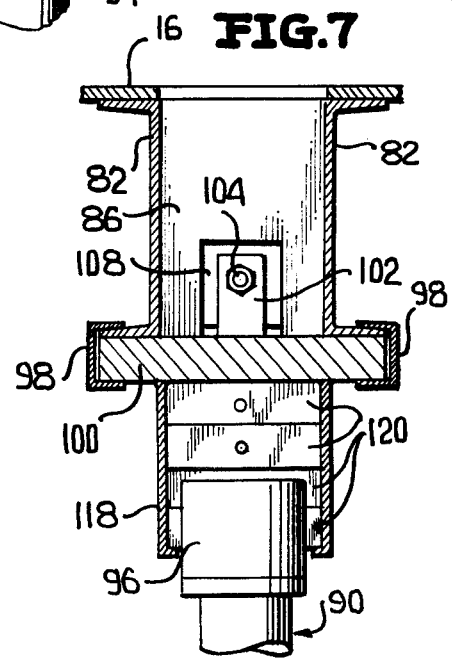
FIG. 7 is a transverse vertical sectional view taken along the line 7—7 of FIG. 6 and shows further the details of the pad assembly.

Referring now to FIGS. 6 and 7 wherein a still further modified form of the invention is illustrated. It is to be understood that secured to the underside of the pad 100 is a housing 118 which has mounted therein in stacked relation a plurality of further pads 120. Each of the pads is urged to the left out of the housing 118 by a spring 122 and movement of each pad to the left is limited by a rod 124.

When the pad 110 is in its retracted position, all of the pads 120 are extended as far as the rods 124 will permit. Then when the press is in its closed position and the pad 100 is moved to the left, depending upon the closed position of the lower press member 16, one or more of the pads 120 may be disposed at an elevation above the head 96 so that they may freely move above the head. All of the pads 120 disposed below the top of the head 96 will engage the head and will be stopped thereby in the manner shown in FIG. 6. Thus, in lieu of using shims such as the shims 114 in FIG. 5, the shims may be in the form of automatically positionable pads.

The opening and closing means have been illustrated as fluid motors. However, it is to be understood that any type of opening and closing means may be utilized including screw actuators and cables or chains.

Although only several preferred embodiments of the invention have been specifically illustrated and described herein, it is to be understood that further minor variations may be made in the press assembly without departing from the spirit and scope of the invention as defined by the appended claims.

I claim:

1. A press assembly comprising a pair of cooperating press members, a first of said press members being stationary and a second of said press members being vertically movable, a first long stroke low force fluid motor connected to said second press member for moving the same vertically upwardly a predetermined distance between a first position remote from said first press member a second position contiguous thereto, a second short stroke high force fluid motor disposed between said second movable press member and a fixed support for imparting a locking force against said second press member in a direction urging said second press member toward said first press member, said second fluid motor locking force direction also resisting movement of said second press member from said second position toward said first position under the influence of gravity, means defining an opening in said second press member for passing at least a portion of said second fluid motor entirely through said second press member in said first position, means positionable to close said opening in said second position for transferring said locking force from said second fluid motor to said second press member, and said last-mentioned means being positioned between a terminal end of said second fluid motor portion and said second press member in said second position.

2. The press assembly as defined in claim 1 including means for selectively adjustably varying the stroke of said second fluid motor.

3. The press assembly as defined in claim 1 wherein said second fluid motor includes a pair of axially aligned cylinders and a piston rod common to both of said pair of cylinders.

4. The press assembly as defined in claim 1 wherein said transferring means is a pad carried by said second press member.

5. The press assembly as defined in claim 1 wherein said transferring means is a pad carried by said second press member, and means for selectively moving said pad into and out of bridging relationship to said opening.

6. The press assembly as defined in claim 1 including means for selectively adjustably varying the stroke of said second fluid motor, said adjusting means are a plurality of shims selectively positionable between said terminal end and said transferring means.

7. The press assembly as defined in claim 1 including means for axially adjusting said terminal end to adjustably vary the stroke of said second fluid motor.

8. A press assembly comprising a pair of cooperating press members, a first of said press members being stationary and a second of said press members being vertically movable, a first long stroke low force fluid motor connected to said second press member for moving the same vertically upwardly a predetermined distance between a first position remote from said first press member and a second position contiguous thereto, a second short stroke high force fluid motor disposed between said second movable press member and a fixed support for imparting a locking force against said second press member in a direction urging said second press member toward said first press member, said second fluid motor locking force direction also resisting movement of said second press member from said second position toward said first position under the influence of gravity, said second fluid motor includes a pair of axially aligned cylinders and a piston rod common to both, a piston separate from said piston rod carried by one of said pair of cylinders, and means for conducting a medium into and out of the other of said pair of cylinders to move said piston rod which in turn effects movement of said piston, whereby said locking force is created by said piston movement.

9. The press assembly as defined in claim 8 including means for selectively adjustably varying the stroke of said second fluid motor.

10. The press assembly as defined in claim 9 wherein said adjusting means are a plurality of shims selectively positionable between said piston and said second press member.

11. The press assembly as defined in claim 9 wherein said adjusting means includes an element carried by and axially adjustable relative to said piston.

12. The press assembly as defined in claim 9 wherein said adjusting means includes an element carried by and axially threadably adjustable relative to said piston.

13. The press assembly as defined in claim 11 wherein said element is generally of a cup-shaped configuration.

14. The press assembly as defined in claim 11 wherein said piston is of a cup-shaped configuration.

* * * * *